United States Patent
Imanishi et al.

(10) Patent No.: US 8,893,847 B2
(45) Date of Patent: Nov. 25, 2014

(54) ELECTRIC POWER STEERING SYSTEM

(71) Applicant: JTEKT Corporation, Osaka (JP)

(72) Inventors: Takashi Imanishi, Okazaki (JP);
Takashi Fuwa, Okazaki (JP)

(73) Assignee: JTEKT Corporation, Osaka (JP)

(*) Notice: Subject to any disclaimer, the term of this patent is extended or adjusted under 35 U.S.C. 154(b) by 8 days.

(21) Appl. No.: 13/672,280

(22) Filed: Nov. 8, 2012

(65) Prior Publication Data

US 2013/0118827 A1    May 16, 2013

(30) Foreign Application Priority Data

Nov. 16, 2011  (JP) ................................. 2011-250937

(51) Int. Cl.
*B62D 5/04* (2006.01)
*F16C 35/07* (2006.01)

(52) U.S. Cl.
CPC ............ *B62D 5/0409* (2013.01); *B62D 5/0427* (2013.01); *F16C 35/07* (2013.01); *B62D 5/0448* (2013.01)
USPC .......................................... 180/443; 180/444

(58) Field of Classification Search
CPC ....... B62D 5/04; B62D 5/0427; B62D 5/0448
USPC ................................ 180/443, 444; 74/388 PS
See application file for complete search history.

(56) References Cited

U.S. PATENT DOCUMENTS

| 2002/0108803 | A1* | 8/2002 | Toyofuku et al. | 180/443 |
| 2003/0099417 | A1* | 5/2003 | Bauer et al. | 384/535 |
| 2011/0127742 | A1* | 6/2011 | Bae et al. | 280/93.513 |
| 2013/0161114 | A1* | 6/2013 | Bando et al. | 180/443 |

FOREIGN PATENT DOCUMENTS

JP   A-2006-213280   8/2006

OTHER PUBLICATIONS

Oct. 21, 2013 Extended European Search Report issued in European Application No. 12192528.3.

* cited by examiner

*Primary Examiner* — Joseph M Rocca
*Assistant Examiner* — Gabriela C Craciun
(74) *Attorney, Agent, or Firm* — Oliff PLC

(57) ABSTRACT

An electric power steering system includes elastic members arranged at respective axial ends of a first bearing by which a motor shaft that serves as a hollow shaft is rotatably supported and which elastically support the first bearing relative to a rack housing in the axial direction; and a support member disposed on the outer periphery of the first bearing to support the first bearing with displacement of the first bearing in the radial direction restricted. The motor shaft is disposed so as to move relative to the rack housing in the axial direction as the first bearing slides relative to the support member while elastically deforming the elastic members and a second bearing moves in the axial direction.

6 Claims, 4 Drawing Sheets

ELECTRIC POWER STEERING SYSTEM

INCORPORATION BY REFERENCE/RELATED APPLICATION

The application claims priority to Japanese Patent Application No. 2011-250937 filed on Nov. 16, 2011 the disclosure of which, including the specification, drawings and abstract, is incorporated herein by reference in its entirety.

BACKGROUND OF THE INVENTION

1. Field of the Invention

The invention relates to an electric power steering system.

2. Discussion of Background

Japanese Patent Application Publication No. 2006-213280 (JP 2006-213280 A) describes a rack assist-type electric power steering system (EPS) that includes a hollow shaft through which a rack shaft is passed and which is rotated by driving a motor. In the electric power steering system, the rotation of the hollow shaft is converted into a reciprocating linear motion of the rack shaft by a ball screw mechanism to apply an assist force to a steering system.

In such an EPS, usually, one end portion of the hollow shaft is rotatably supported by a bearing that receives a radial load and a thrust load, and the other end portion thereof is rotatably supported by a bearing that receives a radial load. The bearing that receives a thrust load and a radial load is disposed in a rack housing that accommodates the rack shaft, with its axial movement restricted, and the bearing that receives a radial load is disposed in the rack housing with its axial movement allowed. For example, an O-ring is disposed on the outer periphery of the bearing that receives a radial load, and this bearing is elastically supported in the radial direction. With this configuration, it is possible to avoid the situation where the bearing contacts the rack housing due to, for example, vibrations caused when a vehicle travels and abnormal noise is thus generated (see FIG. 2 of JP 2006-213280 A).

In the above-described EPS, in a steering within a range of small steering angles before the start of application of assist force, the hollow shaft is not driven by a motor, and hence the rack shaft is moved in its axial direction while the hollow shaft is rotated by a steering force applied by a driver via the ball screw mechanism. That is, at the start of the steering, the ball screw mechanism is actuated by the axial movement of the rack shaft to rotate the hollow shaft, and hence the driver needs to apply a relatively large steering force.

Therefore, as shown in, for example, FIG. 7, elastic members 72 are arranged at respective axial ends of an outer ring 71b of a bearing 71 which receives the above-described thrust and radial loads so that the bearing 71 is elastically supported relative to a rack housing 73 in the axial direction. In addition, O-rings 74 are arranged on the outer periphery of the bearing 71 so that the bearing 71 is elastically supported in the radial direction. Due to elastic deformation of the elastic members 72 and the O-rings 74, a hollow shaft 75 and the bearing 71 are allowed to move together relative to the rack housing 73 in the axial direction. As a result, a rack shaft 76 is allowed to move only by a small amount in the axial direction without rotating the hollow shaft 75. Consequently, it is possible to improve the steering feel at the start of the steering.

However, in the configuration shown in FIG. 7, because the outer periphery of each of both ends of the hollow shaft 75 is supported via the O-rings 74 made of a rubber material, the stiffness for radially supporting the hollow shaft 75 is low. As a result, the hollow shaft 75 easily rattles. As a result, when a steering wheel is operated, the bearing 71 tilts together with the hollow shaft 75 and the bearing 71 is pushed against and caught on the inner peripheral face of the rack housing 73 in some cases. In this case, if the steering wheel is returned, the bearing 71 is removed from the inner peripheral face of the rack housing 73 and returns to its original posture. At this time, the actual steering force instantaneously falls below a steering force required to reciprocate the rack shaft 76, which may cause deterioration of the steering feel. In the case where the hollow shaft 75 constitutes a rotor of a motor, if the hollow shaft 75 rattles, a gap between the hollow shaft 75 and a stator fixed to the inner periphery of the rack housing 73 changes. This may cause, for example, an increase in togging torque.

SUMMARY OF THE INVENTION

The invention provides an electric power steering system in which a hollow shaft is supported so as to be movable along an axial direction relative to a rack housing, and rattling of the hollow shaft is suppressed.

According to a feature of an example of the invention, an electric power steering system includes elastic members that are arranged at respective axial ends of at least one of bearings to elastically support the bearing relative to a rack housing in the axial direction; and a support member that is disposed on the outer periphery of the elastically supported bearing, and that supports the bearing with displacement of the bearing in a radial direction restricted, and a hollow shaft is disposed so as to move relative to the rack housing in the axial direction as the support member and at least one of the rack housing and the elastically supported bearing slide relative to each other.

According to another feature of an example of the invention, the support member has a spring portion that is elastically deformable in the radial direction, and generates a sliding resistance that corresponds to an elastic force of the spring portion.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
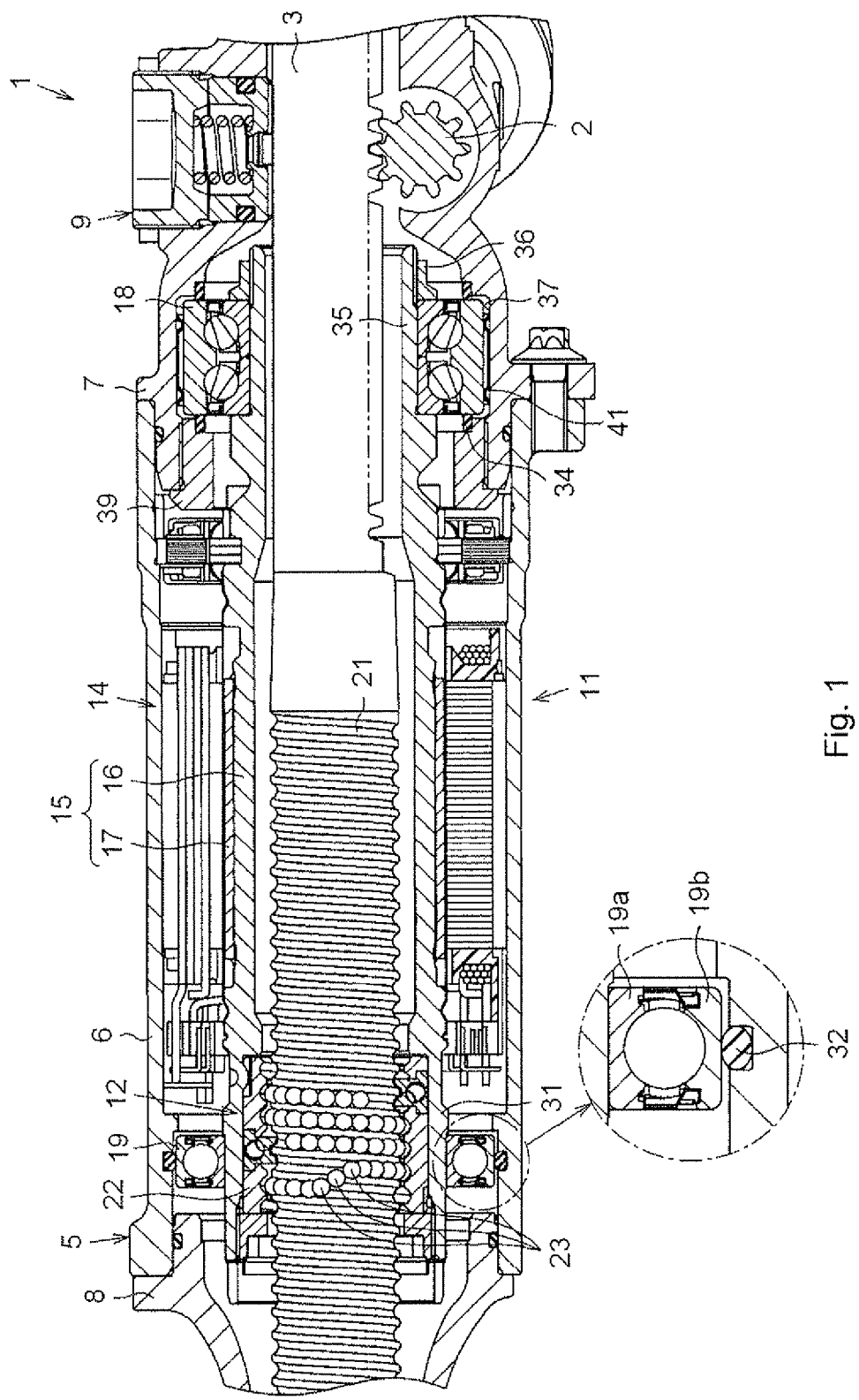
FIG. 1 is a sectional view showing the schematic configuration of an electric power steering system.

As shown in FIG. 1, an EPS 1 includes a pinion shaft 2 that is rotated in response to a steering operation, and a rack shaft 3 that makes a reciprocating motion along the axial direction in accordance with the rotation of the pinion shaft 2 to change the steered angle of steered wheels (not shown).

The EPS 1 includes a substantially cylindrical rack housing 5, and the rack shaft 3 is passed through the rack housing 5. The rack housing 5 is constituted of a center housing 6 formed into a substantially cylindrical shape, a gear housing 7 fixed to one end (the right end in FIG. 1) of the center housing 6, and an end housing 8 fixed to the other end (the left end in FIG. 1) of the center housing 6.

The rack shaft 3 is supported by a rack guide 9 disposed at the gear housing 7 and a sliding bearing (not shown) disposed in the end housing 8 such that the rack shaft 3 is able to reciprocate along its axial direction. In the rack housing 5, the pinion shaft 2 is rotatably supported, and the rack shaft 3 is urged by the rack guide 9 to be engaged with the pinion shaft 2. A steering shaft (not shown) is coupled to one end of the pinion shaft 2, and a steering wheel (not shown) is fixed to a distal end of the steering shaft. The pinion shaft 2 is rotated in response to a steering operation, and the rotation of the pinion shaft 2 is converted into a reciprocating motion of the rack shaft 3. In this way, the steered angle of the steered wheels, that is, the travelling direction of a vehicle is changed.

The EPS 1 includes a motor 11 that serves as a driving source for the EPS 1, and a ball screw mechanism 12 that converts the rotation of the motor 11 into a reciprocating motion of the rack shaft 3. The motor 11 is formed as a brushless motor that includes a stator 14 fixed to the inner periphery of the center housing 6, and a rotor 15 rotatably disposed radially inward of the stator 14. The rotor 15 has a hollow cylindrical motor shaft 16, and a magnet 17 fixed to the outer periphery of the motor shaft 16. The motor shaft 16 is supported so as to be rotatable relative to the rack housing 5 by a first bearing 18 and a second bearing 19 that are arranged near respective ends of the motor shaft. The motor 11 is disposed coaxially with the rack shaft 3 because the rack shaft 3 is passed through the motor shaft 16.

The ball screw mechanism 12 is constituted of a screw portion 21 formed in the rack shaft 3, a ball screw nut 22 fixed to the inner periphery of the motor shaft 16, and a plurality of balls 23 interposed between the screw portion 21 and the ball screw nut 22.

The ball screw nut 22 is formed in a substantially cylindrical shape, and thread grooves are formed in the inner periphery of the ball screw nut 22 and the outer periphery of the screw portion 21. The balls 23 are rollably disposed in a spiral roll path constituted of the thread grooves that face each other. With this configuration, in accordance with the relative rotation between the rack shaft 3 and the ball screw nut 22 (the motor shaft 16), the balls 23 roll in the roll path while receiving loads. The relative position between the rack shaft 3 and the ball screw nut 22 in the axial direction is changed as the balls 23 roll. As a result, the rotation of the motor shaft 16 is converted into the reciprocating motion of the rack shaft 3, and an assist force is applied to a steering system. That is, in the present embodiment, the motor shaft 16 may function as a hollow shaft.

Next, a motor shaft support structure will be described. As shown in an enlarged view in FIG. 1, a single-row ball bearing is employed as the second bearing 19. The motor shaft 16 is rotatably supported by the second bearing 19 in the center housing 6 (the rack housing 5) with its movement in the axial direction allowed. The second bearing 19 receives a radial load.

In the motor shaft 16 at its end portion on the end housing 8 side, a fixing portion 31 is formed such that the outer diameter thereof is substantially equal to the inner diameter of an inner ring 19a of the second bearing 19. The motor shaft 16 is fixed to the second bearing 19 by press-fitting the fixing portion 31 to the inner ring 19a. An outer ring 19b of the second bearing 19 is formed such that the outer diameter thereof is slightly smaller than the inner diameter of the center housing 6. With this configuration, the second bearing 19 supports the motor shaft 16 such that the motor shaft 16 is rotatable, with its axial movement relative to the center housing 6 allowed. On the outer periphery of the outer ring 19b, there is disposed an O-ring 32 that elastically supports the second bearing 19 in the radial direction.

Figure 2:
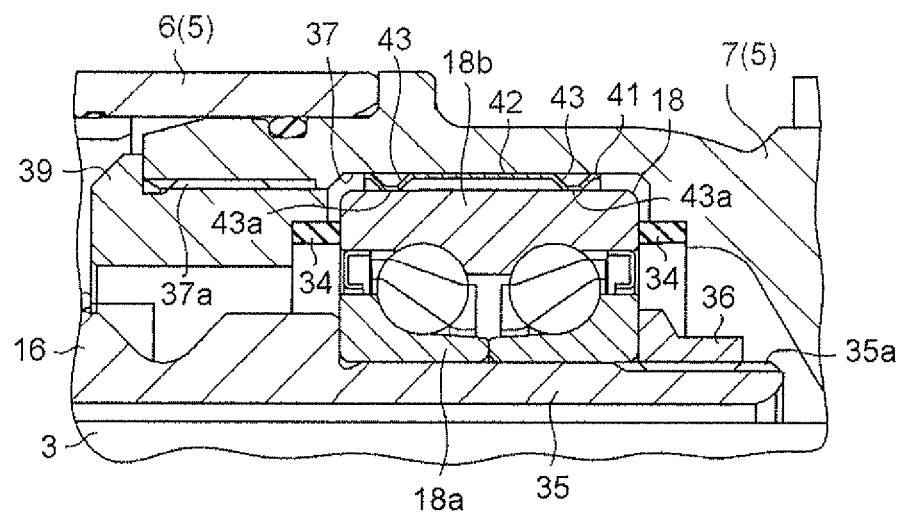
FIG. 2 is an enlarged sectional view of a first bearing and its surrounding portions according to a first embodiment of the invention.

As shown in FIG. 2, a double-row angular contact ball bearing is employed as the first bearing 18. The first bearing 18 supports the motor shaft 16 such that the motor shaft 16 is rotatable, in a state where the first bearing 18 is elastically supported relative to the gear housing 7 (the rack housing 5) in the axial direction by elastic members 34 disposed at respective axial ends of the first bearing 18. The first bearing 18 receives a radial load and a thrust load.

In the motor shaft 16 at an end portion on the gear housing 7 side, a fixing portion 35 is formed such that the outer diameter thereof is substantially equal to the inner diameter of an inner ring 18a of the first bearing 18. In a distal end portion of the outer periphery of the fixing portion 35, a threaded portion 35a is formed. The motor shaft 16 is fixed to the first bearing 18 by press-fitting the fixing portion 35 to the inner ring 18a of the motor shaft 16 and fitting a nut 36 to the threaded portion 35a.

In the inner periphery of the gear housing 7, an annular accommodating recessed portion 37 is formed such that the inner diameter thereof is larger than the outer diameter of an outer ring 18b of the first bearing 18. In a distal end portion of the inner periphery of the accommodating recessed portion 37, a threaded portion 37a is formed. The first bearing 18 is accommodated in the accommodating recessed portion 37 with the elastic members 34 arranged at respective axial ends of the outer ring 18b, and a nut 39 is fitted to the threaded portion 37a. As a result, the first bearing 18 is elastically supported relative to the gear housing 7 in the axial direction.

The elastic members 34 are annular elastic members made of a rubber material, and are compressed in the axial direction between the outer ring 18b and the gear housing 7 and between the outer ring 18b and the nut 39. Axial spaces are formed between one end face of the outer ring 18b and one end face of the accommodating recessed portion 37 and between the other end face of the outer ring 18b and the end face of the nut 39. With this configuration, the first bearing 18 moves relative to the gear housing 7 within a region of each space along the axial direction to contact the end face of the nut 39 or the end face of the accommodating recessed portion 37. Thus, the axial movement of the first bearing 18 is restricted so that the first bearing 18 receives a thrust load.

On the outer periphery of the first bearing 18, there is disposed a support member 41 that supports the outer ring 18b of the first bearing 18 such that the outer ring 18b is slidable while restricting a displacement of the first bearing in the radial direction. The motor shaft 16 is disposed so as to move relative to the gear housing 7 along the axial direction while the elastic members 34 are elastically deformed as the outer ring 18b slides relative to the support member 41.

Figure 3:
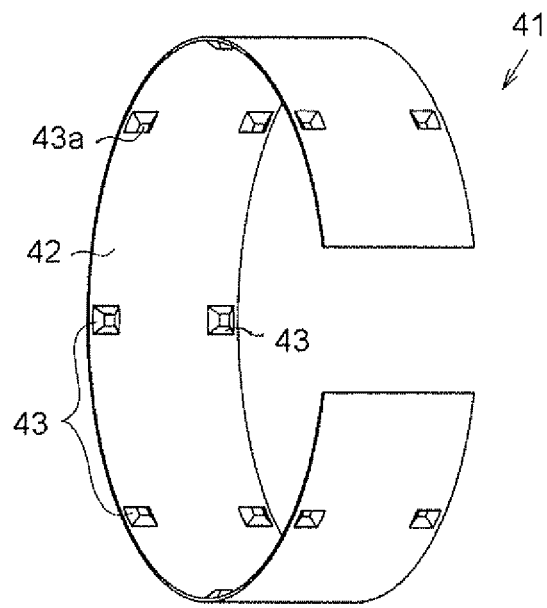
FIG. 3 is a perspective view of a support member according to the first embodiment.

As shown in FIG. 2 and FIG. 3, the support member 41 includes a ring body 42 formed by bending a band-like metal plate (e.g., spring steel or the like) into a substantially C-shape that extends in the circumferential direction of the first bearing 18. In addition, the ring body 42 has a plurality of spring portions 43 which are elastically deformable in the radial direction. The support member 41 is interposed between the inner peripheral face of the accommodating recessed portion 37 of the gear housing 7 and the outer peripheral face of the outer ring 18*b* of the first bearing 18 with the spring portions 43 compressed in the radial direction. A sliding resistance that corresponds to an elastic force of the spring portions 43 is generated.

Each spring portion 43 is formed in a substantially quadrangular pyramid shape that projects radially inward from the ring body 42. The spring portions 43 are formed in respective end portions of the ring body 42 in the axial direction, and are arranged in the circumferential direction at given intervals. An edge face 43*a* of each spring portion 43, which serves as a sliding face that slides relative to the outer ring 18*b*, is subjected to a surface treatment so as to have a low coefficient of friction. Specifically, the edge face 43*a* is coated with a high self-lubricating resin, for example, POM (polyacetal) or PTFE (polytetrafluoroethylene). Furthermore, the support member 41 and each of the spring portions 43 are formed such that an area of contact with the outer ring 18*b* (the total area of the edge faces 43*a*) is sufficiently smaller than an area of contact with the gear housing 7 (the area obtained by subtracting the total area of the spring portions 43 from the area of the outer peripheral face of the ring body 42).

As described above, according to the present embodiment, the following function and effect are produced.

(1) The first bearing 18 slides relative to the support member 41 while elastically deforming the elastic members 34, and the second bearing 19 moves in the axial direction. Thus, the motor shaft 16 moves relative to the rack housing 5 in the axial direction. With this configuration, the rack shaft 3 is moved together with the motor shaft 16 by only a small amount along the axial direction. Therefore, a large steering force is not required even during a steering within a range of small steering angles before the start of application of assist force. As a result, it is possible to improve the steering feel at the start of steering.

Moreover, the support member 41 is made of a metal material, and allows the first bearing 18 to move relative to the rack housing 5 in the axial direction while sliding relative to the support member 41. Therefore, the support stiffness in the present embodiment is higher than that in a configuration where the movement of the first bearing 18 is allowed by the elastic deformation of, for example, an O-ring. As a result, displacement of the first bearing 18 in the radial direction is restricted. That is, it is possible to enhance the stiffness for radially supporting the motor shaft 16, thereby suppressing rattling of the motor shaft 16. As a result, it is possible to prevent the actual steering force from instantaneously falling below a steering force required to reciprocate the rack shaft 3 when the steering wheel is operated in one direction and then returned. Moreover, in the present embodiment, because the support member 41 is disposed, the rattling of the motor shaft 16 is suppressed and a change in the gap between the stator 14 and the magnet 17 is prevented. As a result, for example, an increase in cogging torque is suppressed. Furthermore, because the inner ring 18*a* of the first bearing 18 is fixed to the motor shaft 16, the motor shaft 16 is supported more stably than in a configuration where the inner ring 18*a* is movable relative to the motor shaft 16 in the axial direction.

(2) The spring portions 43 that are elastically deformable in the radial direction are formed in the support member 41, and the sliding resistance that corresponds to the elastic force of the spring portions 43 is generated between the spring portions 43 and the first bearing 18.

In a configuration where a rigid member such as a sliding bearing is used as the support member 41, even slight variations in the dimensions of the support member 41 cause large variations in a pressure (surface pressure) that acts between the support member 41 and the first bearing 18, resulting in large variations in the sliding resistance. However, according to the configuration in the present embodiment, there is generated the sliding resistance that corresponds to the elastic force generated by the elastic deformation of the spring portions 43. Therefore, for example, even when there are slight variations in the dimensions of the support member 41, occurrence of large variations in the sliding resistance generated between the support member 41 and the first bearing 18 is suppressed. Moreover, even when the support member 41 and the like are abraded after the long-term usage, generation of rattling in the radial direction is suppressed.

(3) Because the surface treatment is performed so that the edge face 43*a* of each of the spring portions 43 has a low coefficient of friction, the first bearing 18 is smoothly be slid. As a result, the steering feel at the start of the steering is further enhanced.

(4) The support member 41 is formed such that the area of contact between the spring portions 43 of the support member 41 and the outer ring 18*b* is sufficiently smaller than the area of contact between the support member 41 and the gear housing 7. Therefore, the surface pressure that is applied to the gear housing 7 having the large area of contact with the support member 41 is prevented from being excessively large. As a result, the gear housing 7 has a longer service life.

(5) Because the spring portions 43 are formed in the respective axial end portions of the ring body 42, it is possible to efficiently suppress tilting of the motor shaft 16.

Figure 4:
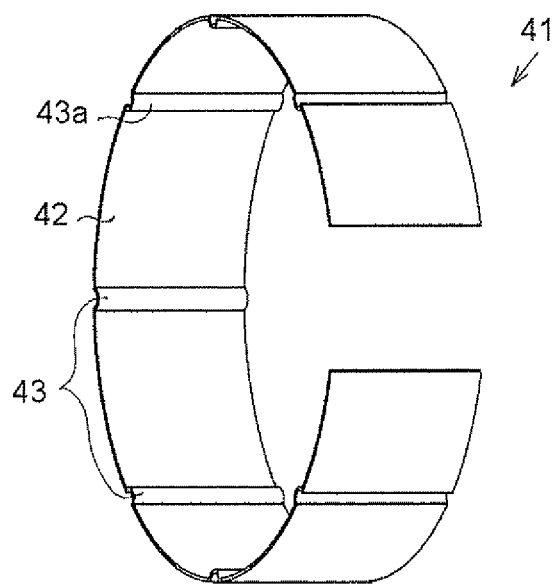
FIG. 4 is a perspective view of a support member according to a second embodiment of the invention.

The following modifications may be made to the above-described embodiment. In the above-described embodiment, each of the spring portions 43 is formed in the substantially quadrangular pyramid shape, but the shape of each spring portion 43 is not limited to this. For example, as shown in FIG. 4, each spring portion 43 may be formed in a shape of a rib that extends in the axial direction of the ring body 42 (second embodiment). Alternatively, each spring portion 43 may be formed in any shapes such as a shape of a rib that extends in the circumferential direction of the ring body 42 and a hemispherical shape, as long as the spring portion 43 is elastically deformable in the radial direction. Furthermore, the spring portions 43 may be formed only at the center of the ring body 42 in the axial direction.

In the above-described embodiment, as the surface treatment performed so that the edge faces 43*a* have the low coefficient of friction, the edge faces 43*a* are coated with a high self-lubricating resin. However, the surface treatment is not limited to this, and, for example, specular-finishing treatment may be performed. Moreover, the edge faces 43*a* need not be subjected to any surface treatment. Furthermore, the edge faces 43*a* may be coated with a lubricant such as grease, regardless of whether the surfaces are subjected to a surface treatment.

Figure 5:
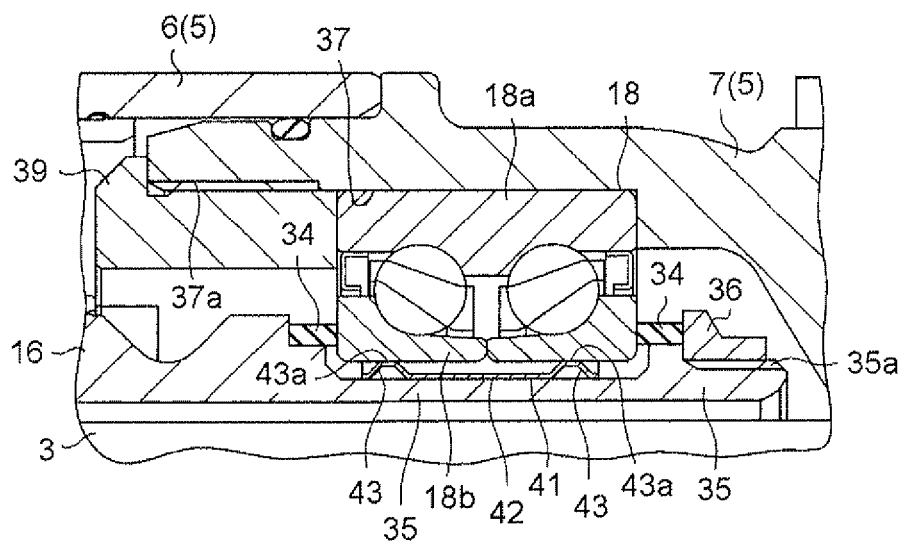
FIG. 5 is an enlarged sectional view of the first bearing and its surrounding portions according to a third embodiment of the invention.

In the above-described embodiment, the elastic members 34 are disposed at the respective axial ends of the outer ring 18*b* of the first bearing 18, and the support member 41 is disposed on the outer periphery of the outer ring 18*b*. However, the invention is not limited to this configuration. For example, as shown in FIG. 5, the elastic members 34 may be disposed at the respective axial ends of the inner ring 18*a* of the first bearing 18, and the support member 41 may be disposed on the inner periphery of the inner ring 18*a*. With this configuration, the motor shaft 16 moves relative to the rack housing 5 in the axial direction, as the first bearing 18 slides relative to the support member 41 (third embodiment). In the embodiment shown in FIG. 5, the inner diameter of the inner ring 18a of the first bearing 18 is larger than the outer diameter of the fixing portion 35 of the motor shaft 16. In addition, the outer diameter of the outer ring 18b is substantially equal to the inner diameter of the accommodating recessed portion 37, and the first bearing 18 is press-fitted into the accommodating recessed portion 37 to be fixed to the gear housing 7. Furthermore, the support member 41 has a plurality of spring portions 43 which project radially outward from the ring body 42 of the support member 41.

Figure 6:
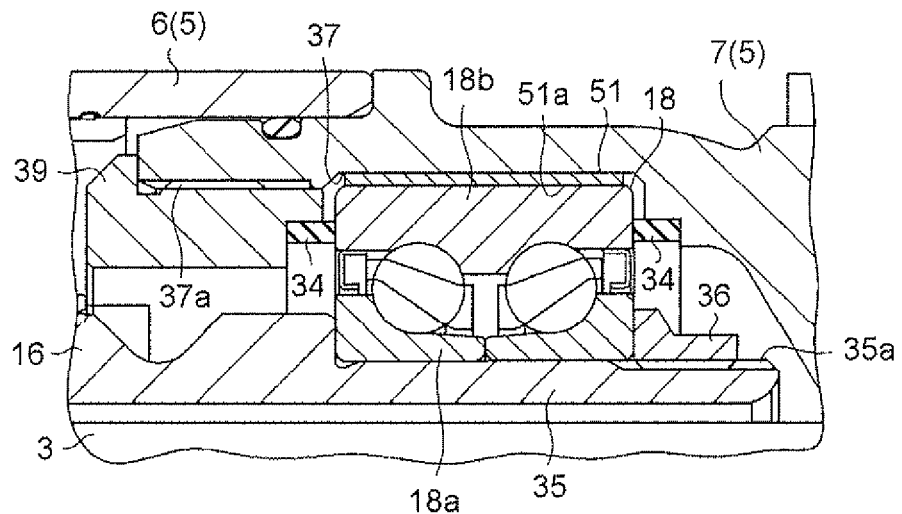
FIG. 6 is an enlarged sectional view of the first bearing and its surrounding portions according to a fourth embodiment of the invention.
Figure 7:
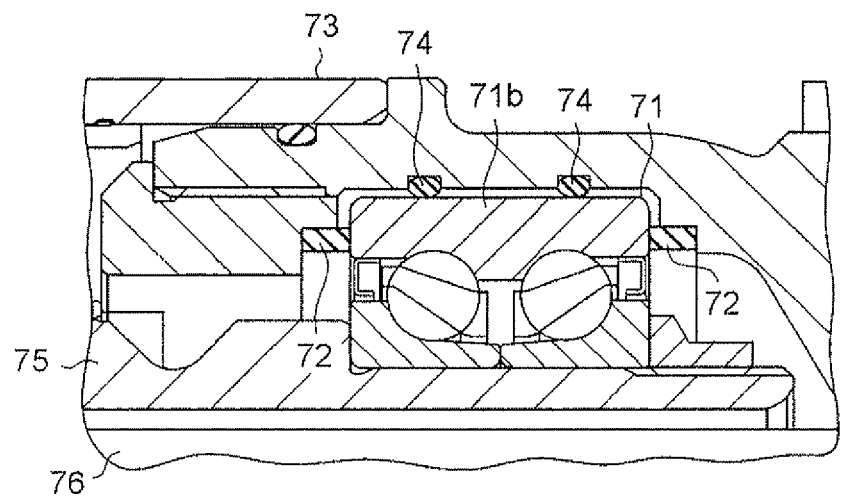
FIG. 7 is an enlarged sectional view of a bearing that receives a thrust load and a radial load and its surrounding portions in related art.

In the above-described embodiment, the support member 41 has the spring portions 43. However, the invention is not limited to this configuration, and a support member may be a rigid member with no spring portions 43 (fourth embodiment). In the embodiment shown in FIG. 6, a support member 51 is formed in a cylindrical shape, and the first bearing 18 is press-fitted into the support member 51. In addition, an inner peripheral face 51a of the support member 51, which serves as a sliding face on which the outer ring 18b of the first bearing 18 slides, is subjected to a surface treatment so that the surface has a low coefficient of friction.

In the above-described embodiment, the elastic members 34 are formed of elastic members made of a rubber material. However, the elastic member 34 need not be formed of elastic members, and the elastic members 34 may be spring members such as coned disc springs.

In the above-described embodiment, as the first bearing 18 slides relative to the support member 41, the motor shaft 16 moves in the axial direction relative to the rack housing 5. However, the invention is not limited to this configuration. For example, there may be employed configurations in which as the support member 41 slides relative to the gear housing 7, or as the first bearing 18 slides relative to the support member 41 and the support member 41 slides relative to the gear housing 7, the motor shaft 16 moves relative to the rack housing 5 in the axial direction.

In the above-described embodiment, the ring body 42 of the support member 41 is formed in a substantially C-shape. However, the shape of the ring body 42 is not limited to this and the ring body 42 may be formed in an annular shape (O-shape).

In the above-described embodiment, the support member 41 is formed such that the area of contact between the support member 41 and the outer ring 18b of the first bearing 18 is smaller than the area of contact between the support member 41 and the gear housing 7. However, the invention is not limited to this configuration, and the area of contact between the support member 41 and the outer ring 18b of the first bearing 18 may be equal to or larger than the area of contact between the support member 41 and the gear housing 7.

In the above-described embodiment, a double-row angular contact ball bearing is employed as the first bearing 18. However, the first bearing 18 is not limited to this and other bearings such as a single-row ball bearing may be employed as the first bearing 18. Similarly, other bearings such as a double-row angular contact ball bearing may be employed as the second bearing 19.

In the above-described embodiment, the second bearing 19 is disposed in the rack housing 5 with its axial movement. However, the invention is not limited to this configuration. For example, the second bearing 19 may be disposed in the rack housing 5 with its axial movement restricted, and the second bearing 19 may support the motor shaft 16 such that the motor shaft 16 is movable relative to the second bearing 19 in the axial direction.

In the above-described embodiment, the O-ring 32 is disposed on the outer periphery of the second bearing 19. Instead of the O-ring 32, a support member may be disposed on the outer periphery or the inner periphery of the second bearing 19 so that as the second bearing 19 slides relative to the support member, the motor shaft 16 moves in the axial direction.

In the above-described embodiment, the invention is applied to the coaxial rack assist-type EPS 1 in which the motor shaft 16 that may function as the hollow shaft is disposed coaxially with the rack shaft 3. However, the invention is not limited to this embodiment, and the invention may applied to, for example, so-called rack cross-type or rack parallel-type EPS in which a hollow shaft through which a rack shaft is passed is driven by a motor disposed outside a housing.

What is claimed is:

1. An electric power steering system including a rack shaft that is supported so as to be able to make a reciprocating motion in an axial direction of the rack shaft, a hollow shaft through which the rack shaft is passed and which is rotated by driving a motor, and a plurality of bearings by which the hollow shaft is supported so as to be rotatable relative to a rack housing that accommodates the rack shaft, the electric power steering system providing an assist force for assisting a steering operation by converting rotation of the hollow shaft into a reciprocating motion of the rack shaft, the electric power steering system, comprising:
    elastic members that are arranged at respective axial ends of at least one of the bearings, and that elastically support the bearing relative to the rack housing in the axial direction; and
    a support member that is disposed on an outer periphery of the elastically supported bearing, and that supports the bearing with displacement of the bearing in a radial direction restricted,
    wherein the hollow shaft is disposed so as to move relative to the rack housing in the axial direction as the support member and at least one of the rack housing and the elastically supported bearing slide relative to each other,
    the support member includes a ring body having a plurality of spring portions formed in respective end portions of the ring body in the axial direction and arranged at given intervals in a circumferential direction of the ring body, with the spring portions being elastically deformable in the radial direction, and
    the support member generates a sliding resistance that corresponds to an elastic force of the spring portions.

2. An electric power steering system including a rack shaft that is supported so as to be able to make a reciprocating motion in an axial direction of the rack shaft, a hollow shaft through which the rack shaft is passed and which is rotated by driving a motor, and a plurality of bearings by which the hollow shaft is supported so as to be rotatable relative to a rack housing that accommodates the rack shaft, the electric power steering system supplying a steering system with an assist force for assisting a steering operation by converting rotation of the hollow shaft into a reciprocating motion of the rack shaft, the electric power steering system, comprising:
    elastic members that are arranged at respective axial ends of at least one of the bearings, and that elastically support the bearing relative to the hollow shaft in the axial direction; and a support member that is disposed on an inner periphery of the elastically supported bearing, and that supports the bearing with displacement of the bearing in a radial direction restricted, wherein the hollow shaft is disposed so as to move relative to the rack housing in the axial direction as the support member and at least one of the hollow shaft and the elastically supported bearing slide relative to each other, the support member includes a ring body having a plurality of spring portions formed in respective end portions of the ring body in the axial direction and arranged at given intervals in a circumferential direction of the ring body, with the spring portions being elastically deformable in the radial direction, and the support member generates a sliding resistance that corresponds to an elastic force of the spring portions.

3. The electric power steering system according to claim 1, wherein a sliding face of the support member is subjected to a surface treatment so as to have a low coefficient of friction.

4. The electric power steering system according to claim 2, wherein a sliding face of the support member is subjected to a surface treatment so as to have a low coefficient of friction.

5. The electric power steering system according to claim 1, wherein the spring portions are formed on an inner peripheral surface of the support member so as to contact the at least one of the bearings.

6. The electric power steering system according to claim 2, wherein the spring portions are formed on an outer peripheral surface of the support member so as to contact the at least one of the bearings.

* * * * *